(12) United States Patent
Higashiyama (10) Patent No.: US 7,440,414 B2
(45) Date of Patent: Oct. 21, 2008

(54) COMMUNICATION RELAY DEVICE WITH REDUNDANCY FUNCTION FOR LINE IN NETWORK IN ACCORDANCE WITH WAN ENVIRONMENT AND COMMUNICATION SYSTEM USING THE SAME

(75) Inventor: Mitsuru Higashiyama, Atsugi (JP)

(73) Assignee: Anritsu Corporation, Tokyo (JP)

( * ) Notice: Subject to any disclaimer, the term of this patent is extended or adjusted under 35 U.S.C. 154(b) by 1063 days.

(21) Appl. No.: 10/174,260

(22) Filed: Jun. 18, 2002

(65) Prior Publication Data
US 2002/0196795 A1 Dec. 26, 2002

(30) Foreign Application Priority Data
Jun. 22, 2001 (JP) ............... 2001-190136

(51) Int. Cl.
*H04L 12/28* (2006.01)
(52) U.S. Cl. ............... 370/254; 370/221; 370/255; 370/285; 370/401; 370/408
(58) Field of Classification Search ........... 370/222, 370/223, 224, 254–256, 386–411, 221, 285
See application file for complete search history.

(56) References Cited

U.S. PATENT DOCUMENTS

| | | | | |
|---|---|---|---|---|
| 5,959,968 | A * | 9/1999 | Chin et al. | 370/216 |
| 6,236,659 | B1 * | 5/2001 | Pascoe | 370/404 |
| 6,262,977 | B1 * | 7/2001 | Seaman et al. | 370/256 |
| 6,611,502 | B1 * | 8/2003 | Seaman | 370/256 |
| 6,724,734 | B1 * | 4/2004 | Shabtay et al. | 370/254 |
| 7,061,875 | B1 * | 6/2006 | Portolani et al. | 370/256 |
| 7,295,552 | B1 * | 11/2007 | Kadambi et al. | 370/392 |
| 2002/0101875 | A1 * | 8/2002 | Lui et al. | 370/402 |
| 2003/0053422 | A1 * | 3/2003 | Ambe | 370/256 |

FOREIGN PATENT DOCUMENTS

JP 06-326711 11/1994

OTHER PUBLICATIONS

ISO\IEC 15802-3: 1998 (E) ANSI\IEEE Std. 802 1D, 1998 Edition, Local and Metropolitan Area Networks: Media Access Control (MAC) Bridges, pp. 58-75, 8. The Spanning Tree Algorithm and Protocol.

(Continued)

*Primary Examiner*—Edan Orgad
*Assistant Examiner*—Venkatesh Haliyur
(74) *Attorney, Agent, or Firm*—Frishauf, Holtz, Goodman & Chick, P.C.

(57) ABSTRACT

A communication relay device with a redundancy function for a line in a network under a WAN environment is connected to another, having a one-to-one relationship at both ends of each line by first and second ports to configure a redundancy channel between lines. A closed port setting section sets one of the ports as a closed port, thereby configuring a network free of a loop between the respective lines. A closed port setting information notifying section notifies a counterpart communication relay device connected to the one port, via the one port, of closed port setting notifying information for notifying that one of the ports has been set as a closed port. A datagram transmission stopping section stops transmission of a datagram from a port of its own connected to the one port set as the closed port when receiving the closed port setting notification information as the counterpart communication relay device.

15 Claims, 7 Drawing Sheets

OTHER PUBLICATIONS

PPP Bridging Control Protocol (BCP), M. Higashiyama; Jul. 2000, pp. 1-33; Network Working Group.

Layer 2 Tunneling Protocal "L2TP"; W. Townsley et al; Aug. 1999; pp. 1-69; Network Working Group.

* cited by examiner

COMMUNICATION RELAY DEVICE WITH REDUNDANCY FUNCTION FOR LINE IN NETWORK IN ACCORDANCE WITH WAN ENVIRONMENT AND COMMUNICATION SYSTEM USING THE SAME

CROSS-REFERENCE TO RELATED APPLICATIONS

This application is based upon and claims the benefit of priority from the prior Japanese Patent Applications No. 2001-190136, filed Jun. 22, 2001, the entire contents of which are incorporated herein by reference.

BACKGROUND OF THE INVENTION

1. Field of the Invention

The present invention relates to a communication relay device with a redundancy function for a line in a network in accordance with a WAN environment, and a communication system using the relay device. More particularly, the present invention relates to a communication relay device with a redundancy function for a line in a network in a WAN environment including a redundancy channel in which a plurality of communication relay devices such as a bridge, a two-layer switch, and a multi-layer switch are connected in a one-to-one manner at both ends of the line, and a communication system using the relay device.

2. Description of the Related Art

A description will be given with respect to a network including a redundancy channel in which a plurality of bridges, for example, as a plurality of communication relay devices, are connected at both ends of a line in a one-to-one manner.

In a network containing a redundant route caused by a plurality of bridges, a spanning tree protocol is used for determining a route.

Figure 7:
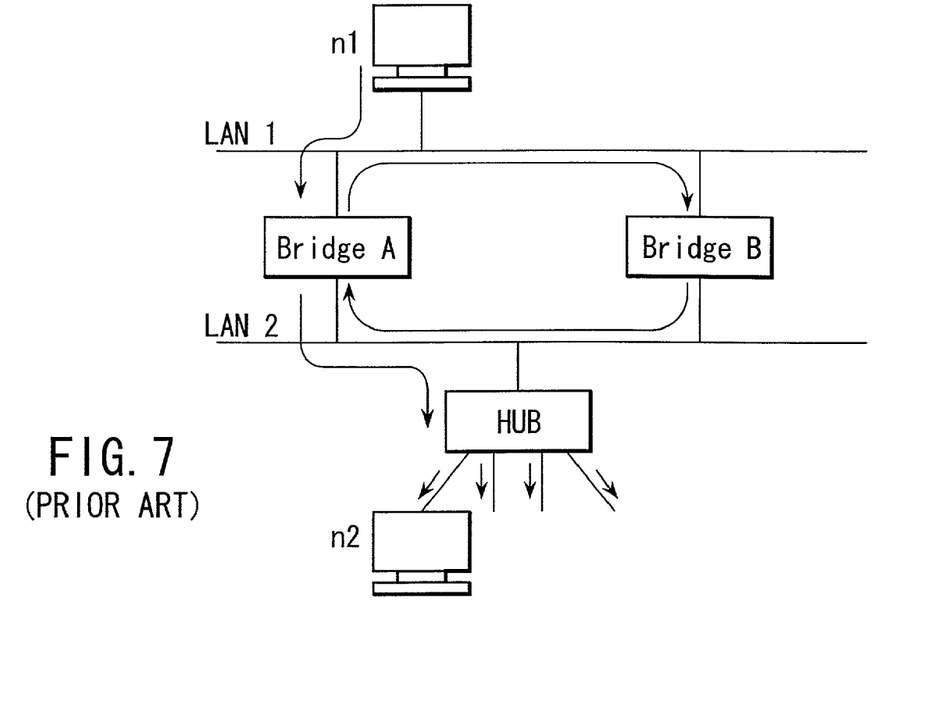
FIG. 7 is a diagram for explaining an object of a conventional spanning tree.

For example, as shown in FIG. 7, assume a network over which LAN 1 and LAN 2 are connected to each other by means of a bridge A.

Here, in the case where of a network over which node "n1" such as personal computer is connected to LAN 1, and further, HUB 1 is connected to LAN 2, packets transmitted from the node "n1" are transmitted to all nodes of a broadcast domain including node "n2" such as personal computer connected to the HUB 1 via LAN 1→bridge A→LAN 2→HUB 1.

Over such network, when HUB 2 is connected to LAN 1 and LAN 2 in parallel to bridge A, a packet transmitted from the node "n1" loops over the network like LAN 1→bridge A→LAN 2→HUB 2→LAN 1→bridge A→LAN 2→HUB 2. As a result, a packet cannot be transmitted from a node other than node "n1" (node in a broadcast domain other than node "n1").

In the case where a network is configured by only bridge A and HUB 1 as shown in FIG. 7, a spanning tree is employed to prevent a packet transmitted from a node from looping over the network.

Figure 8:
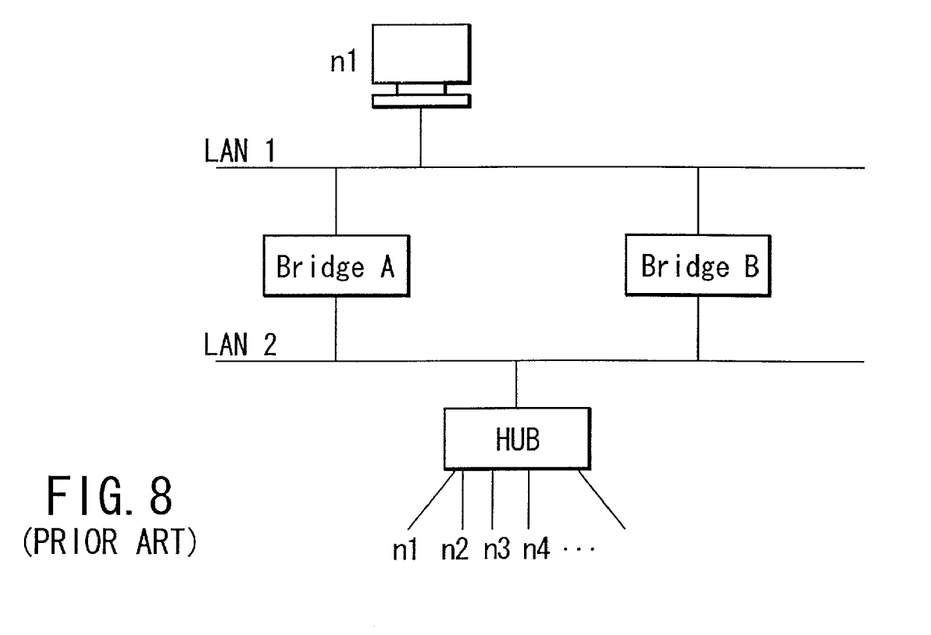
FIG. 8 is a diagram for explaining an object of the spanning tree.

In addition, as shown in FIG. 8, in the case where two bridges A and B are connected in parallel between LAN 1 to which node "n1" such as personal computer is connected and LAN 2 to which HUB 1 is connected, thereby making communication among nodes "n2", "n3", "n4", . . . such as personal computers connected to node "n1" and HUB 1, one bridge A is generally used to make communication. When this bridge A is linked down, the other bridge B is used to make communication, whereby a spanning tree is employed in order to cause a network to provide redundancy.

Here, basic algorithm and protocol of the spanning tree consists of the following items (1) to (5) (Refer to ISO/IEC 15802-3: 1998 (E) ANSI/IEEE Std 802. 1D, 1998 Edition, LOCAL AND METROPOLITAN AREA NETWORKS: MEDIA ACCESS CONTROL (MAC) BRIDGES, pp. 58-75, 8. The Spanning Tree Algorithm and Protocol).

(1) A special frame called Configuration Bridge Protocol Data Units (hereinafter, referred to as BPDU) is exchanged between bridges.

The following works are performed based on this exchanged BPDU.

(2) A network root bridge is selected.

Only one root bridge exists in the entire LAN bridge connected.

(3) Each bridge computes the shortest route that reaches a root bridge (A port that provides the shortest route to the root bridge is called a root port).

(4) With respect to each LAN, a "designated bridge" is selected from a bridge connected to such each LAN.

(5) Each bridge selects a port (designated port) that belongs to a spanning tree and a port (blocked port) that does not belong to such spanning tree.

All data frames received at a blocked port are discarded.

In addition, frame transmission from a blocked port is not performed at all.

A received BPDU is not forwarded at all.

A data portion of the above mentioned BPDU includes at least root ID, bridge ID, and root path cost.

Root ID is an ID of a root bridge (or a bridge assumed to be such root bridge), and is generated based on a MAC address of such bridge and a priority designated by an administrator.

Bridge ID is an ID of a bridge that transmits a BPDU, and is generated based on a MAC address of such bridge and a priority designated by an administrator.

A root path cost is a cost of the (possible) shortest route from a bridge that transmits a BPDU to a root bridge.

In an initial state (when a power is supplied), each bridge is a root bridge itself, and it is assumed that a root path cost is 0.

Each bridge transmits the initial value of a BPDU to all ports, and at the same time, receives the BPDU transmitted from another bridge from all the ports.

In the case where a bridge has received a better BPDU from a port, such bridge stops transmission of BPDU to that port, and then, changes the value of the BPDU to be transmitted by the bridge itself.

In this manner, in the case where a spanning tree enters a stable state, only one bridge transmits a BPDU among each LAN.

For example, in the case where BPDU 1 and BPDU 2 are present, it is judged which of the above two BPDUs is better in accordance with rules (1) to (4) below.

(1) In the case where root ID of BPDU 1 is numerically smaller than that of BPDU 2, it is judged that BPDU 1 is better than BPDU 2.

(2) In the case where root ID of BPDU 1 is numerically equal to that of BPDU 2, if a root path cost of BPDU 1 is smaller than that of BPDU 2, it is judged that BPDU 1 is better than BPDU 2.

(3) In the case where root-ID of BPDU 1 is numerically equal to that of BPDU 2, and a root path cost of BPDU 1 is equal to that of BPDU 2, if bridge ID of BPDU 1 is numerically smaller than that of BPDU 2, it is judged that BPDU 1 is better than BPDU 2.

(4) In the case where root ID of BPDU 1 numerically equal to that of BPDU 2, a root path cost of BPDU 1 is equal to that of BPDU 2, and bridge ID of BPDU 1 is numerically equal to that of BPDU 2, if port ID of BPDU 1 is smaller than that of BPDU 2, it is judged that BPDU 1 is better than BPDU 2.

Then, each bridge compares the initial value of its own BPDU with that of the BPDU from another bridge received from all ports, and selects root ID from the best BPDU.

Next, each bridge computes its own root path cost in accordance with (root path cost)=(root path cost in the best BPDU)+path cost.

A path cost is a cost to the root that each port individually has, and the value of the cost can be set by an administrator.

Once a root ID, a route port, and a root path cost are defined, each bridge updates the content of BPDU transmitted by such each bridge itself.

Further, its own updated BPDU is compared with BPDU received from a port other than root port, and it is judged whether or not each port other than root port is a designated bridge itself.

A port that is a designated bridge is called a designated port, and a port that is not a designated bridge is called a blocked port.

In BPDU transmission and data frame forwarding to a root port, a designated port and a blocked port, a data frame is forwarded at the root port without transmitting BPDU; BPDU is transmitted, and a data frame is forwarded at the designated port; and BPDU is not transmitted, and a data frame is not forwarded at the blocked port.

In this manner, once a spanning tree is configured, each bridge performs regular operations described in (1) to (4) below.

These regular operations are required for reconfiguring a spanning tree that has been configured due to a bridge fault or addition of new bridge.

(1) BPDU includes an element called "message age".

This value denotes an elapsed time after a root bridge has generated a BPDU that corresponds to the above BPDU.

(2) A root bridge transmits its own BPDU periodically to all ports. At this time, "message age" is set to 0.

(3) Each bridge stores a received BPDU, and increases the value of the "message age" of the BPDU stored in each port with an elapse of time (message age timer).

(4) A bridge other than root bridge transmits its own BPDU when it receives a BPDU from a root port.

At this time, as a value of the "message age", there is used a value equal to or greater than the "message age" of the root port and greater than the "message age" of the received BPDU.

Here, the reconfiguration of the spanning tree occurs in any of the cases described in (1) and (2) below.

(1) In the case where the "message age" timer of the stored BPDU times out (in the case where a max age is exceeded); or (2) In the case where a BPDU better than that stored in a port or a BPDU with the small value of the message age is received from the same port.

In the case where any of the above events occurs, a bridge performs re-computation for a root ID, a root cost, and a root port.

In the meantime, it is very dangerous to perform data frame transmission before all the bridges over a network enters a normal state after configuration (reconfiguration) of a spanning tree has been started.

This is because there is a possibility that a temporary loop occurs during spanning tree configuration.

Therefore, even if each bridge determines its own designated port, it does not start data frame forwarding immediately.

There are three types of the states of each port in a bridge:

(1) listening: No work concerning a data frame is carried out.

(2) learning: Although the learning of a starting MAC address is performed, forwarding is not performed.

(3) forwarding: Data frame forwarding is performed.

The lengths of the listening state and learning state are called a "forward delay". A root bridge determines its value, enters its value in a BPDU, and transmits the fact to each bridge.

In addition, a timer employed in the listening state and learning state is called a "forwarding timer".

If spanning tree reconfiguration occurs, a host position changes, and the contents of an old learning table may be incorrect.

Thus, the bridge corresponding to a spanning tree has the following two kinds of states as timeout values of the learning table aging timer.

(1) Normal value: This value is set to a long time such as a few minutes.

(2) A value used after topology change: This value is the same as the forward delay value.

When a bridge senses spanning tree reconfiguration, the timeout value of the learning table aging timer is set to a value identical to forward delay for a predetermined period of time.

In the meantime, a spanning tree algorithm and protocol have a system that notifies to all bridges that spanning tree reconfiguration has occurred as in (1) to (5) below.

(1) When a bridge senses a topology change, that bridge transmits a frame called TCN-BPDU (Topology Change Notification BPDU) to a root port with hello time intervals.

This transmission is continued until a BPDU in which a TCA (Topology Change Acknowledgment) flag is set has been received from the root port.

(2) A bridge which has received TCN-BPDU also transmits TCN-BPDU to its own root port.

On the other hand, to a port that receives a TCN-BPDU, a BPDU TCA flag is set, and a BPDU is transmitted during transmission of the next BPDU.

(3) In the case where a root bridge receives a TCN-BPDU or the state of its own port changes, the root bridge transmits a BPDU in which a TC (Topology Change) flag is set from that time to a max age+forward delay time.

(4) A bridge which has received the TC flag set BPDU from a root port sets a TC flag for its own BPDU, and transmits such BPDU.

This transmission is continued until a BPDU in which a TC flag is not set has been received.

(5) While a bridge receives TC flag set BPDU from the root port, the bridge uses the value of "forward delay" as a timeout value of the learning table aging timer.

In this way, a spanning tree has an algorithm for automatically removing a loop in a redundant bridge network, and automatically sensing a network topology change caused by a device fault or cable failure, thereby automatically changing a network topology so as to prevent a loop from being produced.

In the meantime, a spanning tree works so as not to form a loop in a network, as described above.

Figure 9:
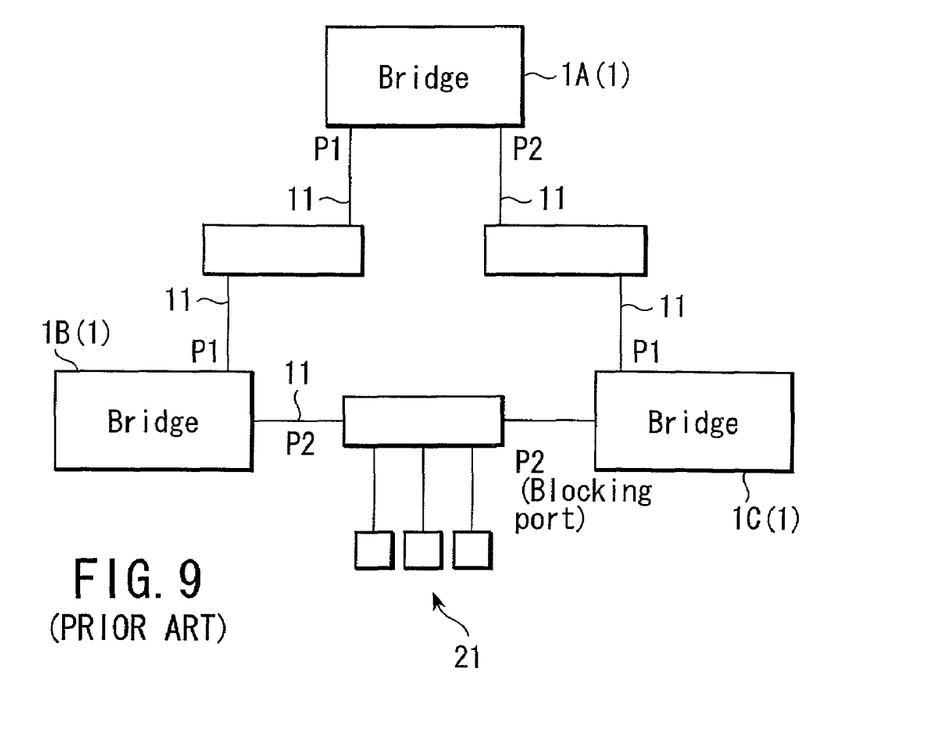
FIG. 9 is a diagram showing an example of a network with a spanning tree structure including a conventional redundancy channel.

For example, as shown in FIG. 9, in a network 21 with a spanning tree structure including a redundancy channel in which three bridges 1 (1A to 1C) are connected to each other via a bus type LAN 11, there is a need to transmit a packet to an opening of a closed port in a blocking state in order to enable transmission/reception of a packet relevant to a node (not shown) to be connected to the bus type LAN 11 among the bridges 1A to 1C. In the conventional spanning tree, a loop is cut at a point.

In an example shown in FIG. 9, a port P2 of the bridge 1C enters a blocking state in which packet forwarding is not carried out, thereby preventing a broadcast from being looped.

At this time, the bridge 1C determines whether or not the blocking state is established. Thus, the bridge 1B does not know whether or not the port P2 of the bridge 1C enters the blocking state.

Namely, a broadcast packet flows between the bridge 1B and the bridge 1C, but the bridge 1C discards a packet received from the port P2. Thus, a loop is cut out.

As described above, the conventional spanning tree does not have any particular problem as long as the tree is used in a LAN environment.

This is because nobody has no problem even if a redundant traffic flows between the bridge 1B and the bridge 1C in FIG. 9, for example.

However, in the latest technology, it is possible to supply the data between the bridges via a WAN (wide area network) by using a BCP (Bridge Control Protocol) (refer to Higashiyama, PPP Bridging Control Protocol, Internet Engineering Task Force, July, 2000) defining procedures for transferring an Ethernet (R) frame over PPP (Point to Point Protocol) connection.

Further, it is possible to use a utilization method of supplying WAN data via Internet by using an L2TP (Layer 2 Tunneling Protocol) described later, the protocol being a VPN (virtual private network) technology.

Otherwise, there is known a technology of supplying data via Internet by providing an IP header in front of the Ethernet (R) frame and encapsulating the header.

In combination between a method of supplying data over the above described WAN and a method of supplying the WAN data over Internet, it is possible to construct a spanning tree over Internet.

Figure 10:
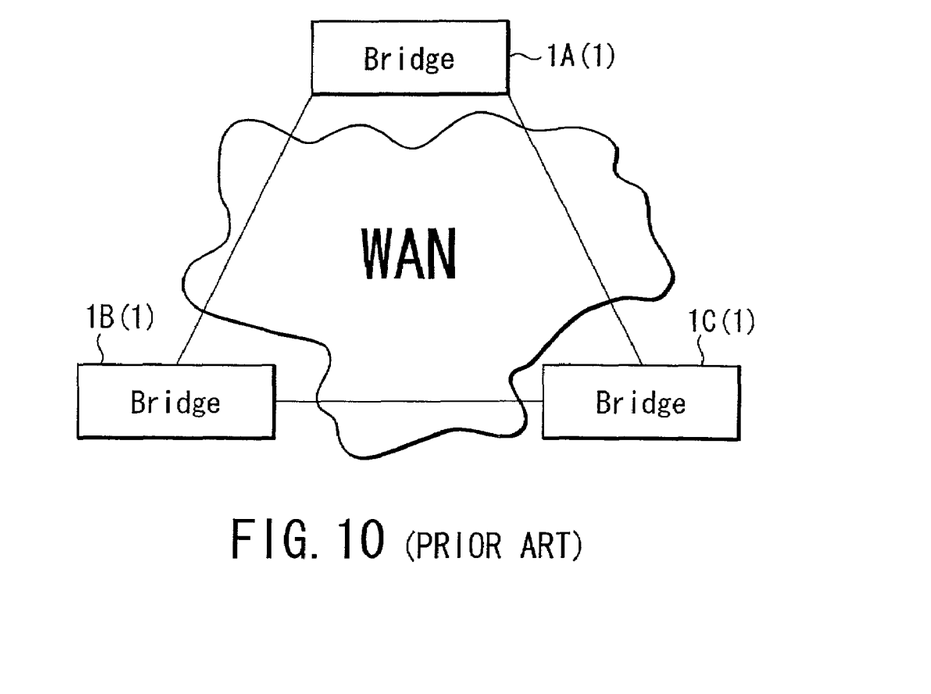
FIG. 10 is a diagram showing an example of a network when a connection is made between bridges each having a spanning tree structure including the conventional redundancy channel via a WAN.

In this method, for example, as shown in FIG. 10, in a network in accordance with the WAN network, a packet from the bridge 1B to the bridge 1C is discarded at the bridge 1C. However, the bridge 1B does not know the fact, and continuously transmits a packet to the bridge 1C via Internet.

Thus, there is a problem that redundant data is supplied over Internet, and a redundant traffic occurs with Internet that is a shared resource, causing impaired line efficiency.

In addition, there is a problem that, where a connection is made between the bridge 1B and the bridge 1C via the WAN, thereby constructing a network in which accounting is carried out based on the number of packets to be communicated, redundant packet communication is carried out between the bridge 1B and the bridge 1C, and the packet itself increases a communication cost.

BRIEF SUMMARY OF THE INVENTION

The present invention has been made in order to solve the foregoing problems. It is an object of the present invention to provide a communication relay device with a redundancy function for a line in a network in accordance with a WAN environment capable of reducing outflow of redundant data to the line, thereby improving line efficiency in the network in accordance with the WAN environment in which a plurality of communication relay devices are connected with each other in a one-to-one manner at both ends of the line; and a communication system and method with a redundancy function for the line using the relay device.

In order to achieve the above object, according to a first aspect of the present invention, there is provided a communication relay device (1) with a redundancy function for a line to be connected in a one-to-one manner at both ends of each line so as to configure a redundancy channel among a plurality of lines (2) in a network in accordance with a WAN environment, the relay device comprising:

first and second ports (P1, P2) which are connected to each other to have a one-to-one relationship with each other at both ends of such each line;

a closed port setting section which sets one of the first and second ports as a closed port, thereby configuring a network (3) free of a loop between the respective lines;

a closed port setting information notifying section which notifies a counterpart communication relay device connected to the one port, via the one port, of closed port setting notification information for notifying that one of the first and second ports is set as a closed port, the counterpart communication relay device being constructed in the same manner that of the relay device; and a datagram transmission stopping section which, when receiving the closed port setting notification information as the counterpart communication relay device, stops transmission of a datagram from its own port connected to the one port set as the closed port.

In order achieve the above object, according to a second aspect of the present invention, there is provided a communication relay device with a redundancy function for a line according to the first aspect, wherein the plurality of lines include first and second lines.

In order achieve the above object, according to a third aspect of the present invention, there is provided a communication relay device with a redundancy function for a line according to the first aspect, wherein the plurality of lines include first, second, and third lines.

In order achieve the above object, according to a fourth aspect of the present invention, there is provided a communication relay device with a redundancy function for a line according to the first aspect, wherein the datagram is transmitted/received via any of an Internet VPN, a leased line, and a dialup network.

In order achieve the above object, according to a fifth aspect of the present invention, there is provided a communication relay device with a redundancy function for a line according to the first aspect, wherein the communication relay device is a bridge.

In order achieve the above object, according to a sixth aspect of the present invention, there is provided a communication system with a redundancy function for a line in a network in accordance with a WAN environment, the communication system comprising:

a plurality of lines (2); and a plurality of communication relay devices (1) to be connected in a one-to-one manner at both ends of each line so as to configure a redundancy channel among the plurality of lines (2) in a network, wherein the plurality of communication relay devices each comprises:

first and second ports (P1, P2) which are connected to each other to have a one-to-one relationship with each other at both ends of such each line;

a closed port setting section which sets one of the first and second ports as a closed port, thereby configuring a network (3) free of a loop between the respective lines;

a closed port setting information notifying section which notifies a counterpart communication relay device connected to the one port, via the one port, of closed port setting notification information for notifying that one of the first and second ports is set as a closed port, the counterpart communication relay device being constructed in the same manner that of the relay device; and a datagram transmission stopping section which, when receiving the closed port setting notification information as the counterpart communication relay device, stops transmission of a datagram from its own port connected to the one port set as the closed port.

In order achieve the above object, according to a seventh aspect of the present invention, there is provided a communication system with a redundancy function for a line according to the sixth aspect, wherein the plurality of lines include first and second lines, and the plurality of communication relay devices include first and second communication relay devices.

In order achieve the above object, according to an eighth aspect of the present invention, there is provided a communication system with a redundancy function for a line according to the sixth aspect, wherein the plurality of lines include first, second, and third lines, and the plurality of communication relay devices include first, second, and third communication relay devices.

In order achieve the above object, according to a ninth aspect of the present invention, there is provided a communication system with a redundancy function for a line according to the sixth aspect, wherein the datagram is transmitted/received via any of an Internet VPN, a leased line, and a dialup network.

In order achieve the above object, according to a tenth aspect of the present invention, there is provided a communication system with a redundancy function for a line according to the sixth aspect, wherein the communication relay device is a bridge.

In order achieve the above object, according to an eleventh aspect of the present invention, there is provided a communication method with a redundancy function for a line in accordance with a WAN environment, the communication method comprising:

providing a plurality of lines (2);

connecting a plurality of communication relay devices (1) to each other in a one-to-one manner at both ends of each line by first and second ports (P1, P2) thereof so as to configure a redundancy channel between the respective lines of the plurality of lines (1);

setting one of the first and second ports as a closed port so that any of the plurality of communication relay devices configures a network (3) free of a loop between the respective lines;

notifying a counterpart relay device connected to the one port, via the one port, of closed port setting notification information for notifying that the communication relay device which has set one of the first and second ports as a closed port set one of the first and second ports as a closed port, the counterpart communication relay device being constructed in the same manner that of the relay device; and when receiving closed port setting notification information as the counterpart communication relay device, stopping transmission of a datagram from its own port connected to the one port set as the closed port.

In order achieve the above object, according to a twelfth aspect of the present invention, there is provided a communication method with a redundancy function for a line according to the eleventh aspect, wherein the plurality of communication lines include first and second lines and the plurality of communication relay devices include first and second communication devices.

In order achieve the above object, according to a thirteenth aspect of the present invention, there is provided a communication method with a redundancy function for a line according to the eleventh aspect, wherein the plurality of lines include first, second, and third lines, and the plurality of communication relay devices include first, second, and third communication relay devices.

In order achieve the above object, according to a fourteenth aspect of the present invention, there is provided a communication method with a redundancy function for a line according to the eleventh aspect, wherein the datagram is transmitted/received via any of an Internet VPN, a leased line, and a dialup network.

In order achieve the above object, according to a fifteenth aspect of the present invention, there is provided a communication method with a redundancy function for a line according to the eleventh aspect, wherein the communication relay device is a bridge.

In order achieve the above object, according to a sixteenth aspect of the present invention, there is provided a communication method configuring a network in accordance with a WAN environment in which first, second and third bridges are connected to each other via three lines so as to configure a redundancy channel, a port of the first bridge and a port of the second bridge being connected via one of the three lines, the network being free of a loop by closing one of these ports, the communication method comprising:

by one of the first bridge and the second bridge having the closed port, transmitting a signal which notifies that the port of its own is closed to the other of the first bridge and the second bridge via the first line; and by the other of the first bridge and the second bridge stopping transmission of a datagram from the port of its own to the first line upon the receipt of the signal.

In order achieve the above object, according to a seventeenth aspect of the present invention, there is provided a bridge for use as a first bridge in a communication method configuring a network in accordance with a WAN environment in which first, second, and third bridges are connected to each other via three lines so as to configure a redundancy channel, a port of the first bridge and a port of the second bridge being connected to each other via a first line of the three lines, the network being free of a loop by closing one of these ports, the bridge comprising:

means for, when the port of the first bridge is closed, transmitting a signal which notifies that the port is closed from the closed port; and means for, when the signal which notifies that the port is closed is received from the second bridge, stopping transmission of a datagram to the closed port of the second bridge.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

DETAILED DESCRIPTION OF THE INVENTION

Reference will now be made in detail to the presently preferred embodiments of the invention as illustrated in the accompanying drawings, in which like reference numerals designate like or corresponding parts.

A communication system according to the present invention is employed in a network in accordance with the WAN environment as described previously in which a plurality of communication relay devices (such as a bridge, a two-layer switch, or a multi-layer switch) are connected to each other at both ends of a line in a one-to-one manner, the network including a redundancy channel.

Figure 1A:
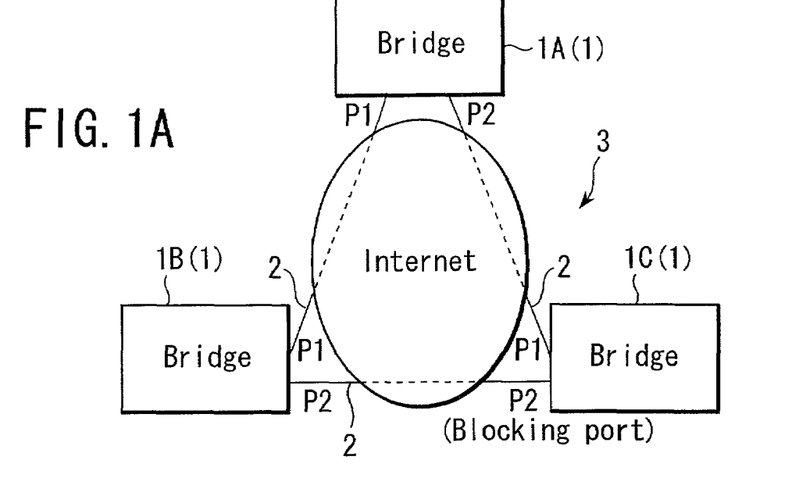
FIG. 1A is a block diagram depicting one embodiment of a communication system with a redundancy function for a line according to the present invention.

In one embodiment shown in FIG. 1A, there is configured a network 3 in which three bridges 1 (1A, 1B, 1C) being communication relay devices are connected at both ends of a line 2, the network including a redundancy channel.

In this network 3, the spanning tree protocol as described previously is used for determining a channel.

In addition, in the network 3 shown in FIG. 1, as the network in accordance with the WAN environment as described previously, in the case where Ethernet (R) data is supplied between the bridges 1A to 1C over a VPN utilizing Internet, the L2TP (Layer 2 Tunneling Protocol) as described previously is used.

This L2TP is a connection type tunneling protocol for tunneling a data link layer (PPP: Point to Point Protocol), thereby constructing the VPN for making connection between sites (between LANs) (refer to Townsley et al, Layer Two Tunneling Protocol, Internet Engineering Task Force, August, 1999).

In this L2TP, procedures for tunneling a PPP session between a LAC (L2TP Access Concentrator) and an LNS (L2TP Network Server) are defined.

In this L2TP, there are a case where data is supplied over an IP (internet protocol)—an UDP (user datagram protocol) and a case where data is supplied over an ATM (asynchronous transfer mode)—a VC (virtual channel).

Here, a description will be given by way of example when data is supplied over the IP-UDP.

Figure 2:
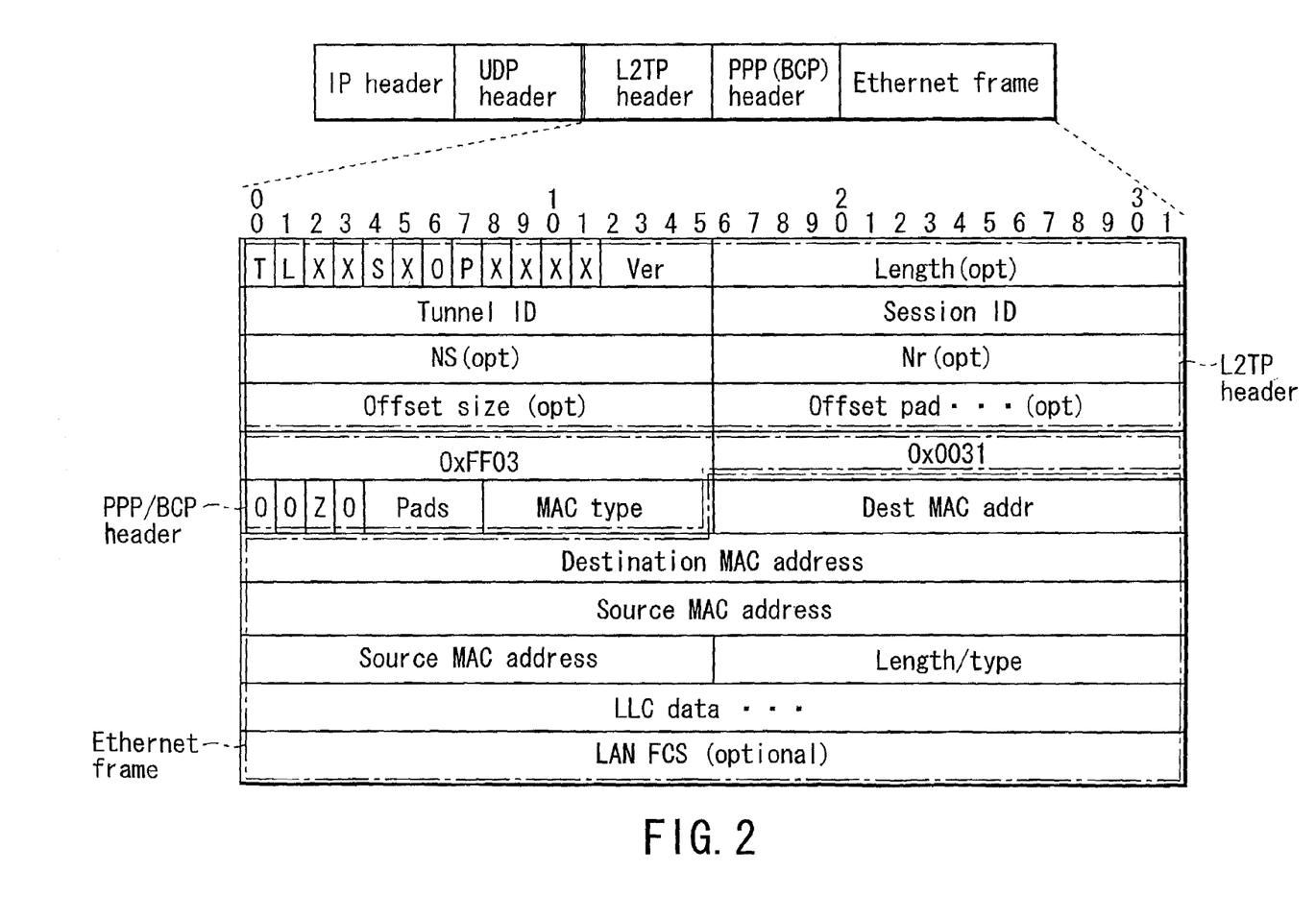
FIG. 2 is a view showing a format when Ethernet (R) data is supplied over a L2TP in the communication system of FIG. 1A.

In the ease where data is supplied over the IP-UDP, as shown in FIG. 2, a format consisting of an IP-Header, an UDP-header, an L2TP-header, a PPP (BCB)-Header, and an Ethernet (R)-Frame is used.

In a L2TP environment transmission/reception frame, the data over the UDP is exchanged.

Further, in this L2TP, an L2TP tunnel (control connection) is established before starting data communication (PPP communication) of a user session.

When this L2TP tunnel is established, a counterpart can be authenticated so as to disable an illegal counterpart from making a request for establishing a tunnel, thereby establishing an illegal tunnel.

Here, a control connection is established in the L2TP by exchanging the L2TP messages: (1) SCCRQ (Start-Control-Connection-Request, a request for establishing a connection); (2) SCCRP (Start-Control-Connection-Reply, a response for establishing a connection); and (3) SCCCN (Start-Control-Connection-Connected, an establishment of connection), that is, in accordance with a three-way handshake (exchanging these three messages, thereby establishing a control connection).

When the above control connection is established, a user session can be loaded on this connection.

This user session is established in accordance with the three-way handshake for exchanging: (1) ICRQ (Incoming-Call-Request, an incoming call request); (2) ICRP (Incoming-Call-Reply, an incoming call response); and (3) ICCN (Incoming-Call-Connected, an incoming call connection).

When the above user session reaches an established state, the PPP frame is exchanged over a tunnel.

In the L2TP tunnel, in the case of disconnecting a specific session, a CDN (Call-Disconnect-Notify, notification of call disconnection) including a call ID of a target session is transmitted to a counterpart.

The CDN receiver side releases a resource that has been used by a session of the specified call ID.

In addition, in the case of releasing the tunnel itself, a Stop CCN (Stop-Control-Connection-Notification, notification of the end of control connection) including a target tunnel ID is transmitted to an end point of the tunnel.

In the above described configuration, the bridges 1 (1A and 1B) of the present embodiment each have a function for notifying a counterpart bridge connected to a port opposed to its own port of information indicative of an open/closed state of its own port by means of a signal or packet.

In the present embodiment, as a method of notifying a counterpart bridge of information indicative of an open/closed state of its own port, any one of the following methods (1) and (2) is employed:

(1) a method for, since a conventional spanning tree protocol itself periodically delivers a BPDU that is topology data in a network all the time to a counterpart bridge, adding a flag for notifying this BPDU of a port state; and (2) a method for providing a control packet other than BPDU, thereby notifying the counterpart bridge of the fact periodically or at a timing of a state change by using this control packet.

First, when the above method (1) is employed, the least significant bit of TC in "fliags" corresponding to the BPDU data portion is used as a flag indicative of an open/closed state of its own port.

For example, when its own port is a closed port, a flat is set to 1, and when it is not a closed port, the flag is set to 0, thereby exchanging the BPDU between bridges.

In a method of using the least significant bit of TC that is a part of the BPDU data as a flag indicative of the open/closed state of the port, first, a closed port (a blocking port) is determined in accordance with procedures for a general spanning tree.

Figure 3A:
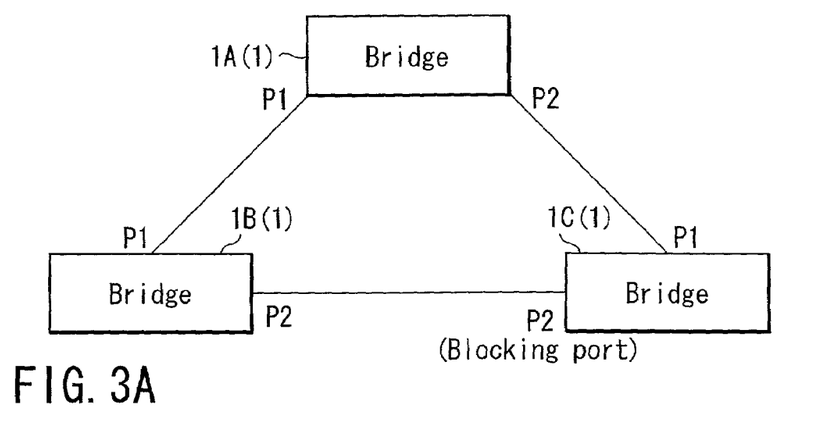
FIG. 3A, FIG. 3B, and FIG. 3C are diagrams each for explaining an operation when notifying a counterpart bridge that a port of a predetermined bridge has been blocked in the communication system of FIG. 1A.
Figure 3B:
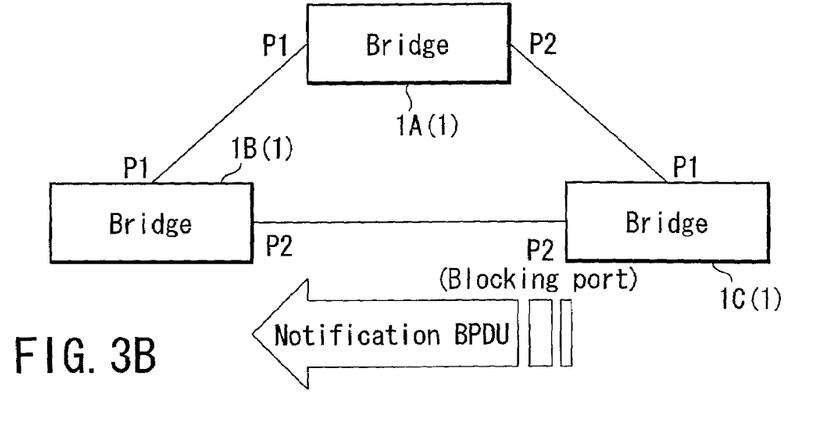

When a port P2 of the bridge 1C is determined as a closed port as shown in FIG. 3A, a notification BPDU for notifying that the bridge 1C enters a blocking state from a closed port, i.e., a notification BPDU for setting the BPDU least significant bit flag to 1, is outputted to the bridge 1B (refer to FIG. 3B).

Figure 3C:
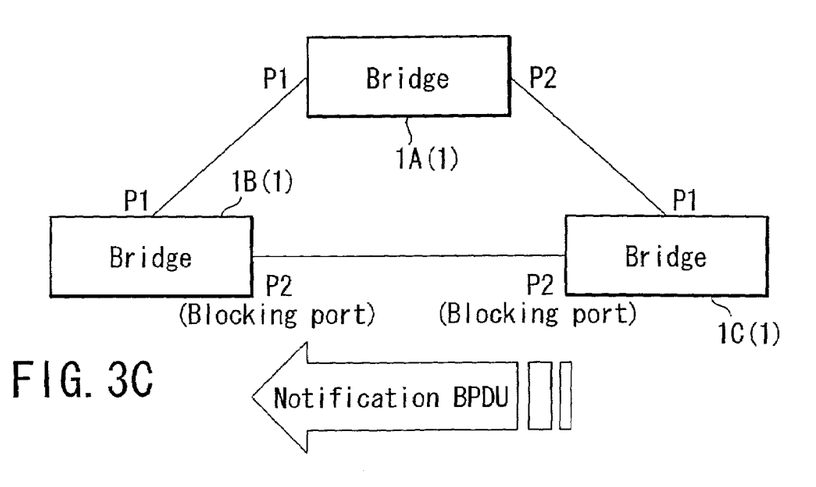

The bridge 1B having received this notification BPDU causes its own port P2 to enter a blocking state, and sets this port as a closed port when the flag of TC of the notification BPDU is set to 1 (refer to FIG. 3C).

If a link-down occurs for any reason (such as cable reconnection, invalid port setting, or change of a communication channel caused by a communication failure) or if a closed port that has been stopped is restored, whereby an operation for reconfiguring a spanning tree has been executed, a flag indicative of an open/closed state of a port of the BPDU periodically exchanged between the bridges is checked, and its own port is opened/closed.

Figure 4:
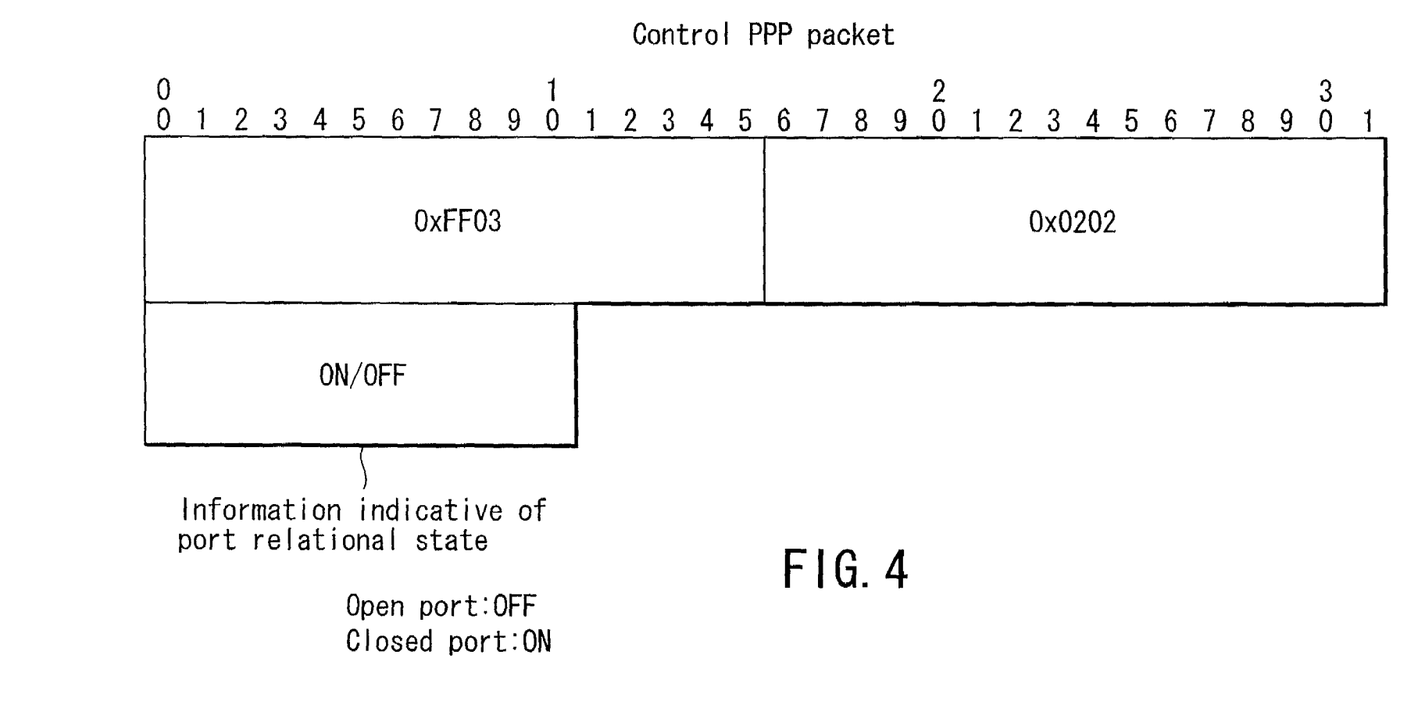
FIG. 4 is a view showing a control PPP packet which is outputted by a bridge in the communication system of FIG. 1A.

When the above method (2) is employed, a control PPP packet shown in FIG. 4 is used.

This control PPP packet is a packet that notifies a counterpart whether blocking is turned ON/OFF.

The bridges 1A to 1C each output a control PPP packet in which blocking is turned ON when any port of its own is determined as a closed port, thereby entering a blocking state.

In contrast, the bridges 1A to 1C each output a control PPP packet in which blocking is turned OFF when a closed port of its own enters a listening state.

This control PPP packet is notified to a bridge of a port connected to be opposed to a port of that bridge when a change occurs with the open/closed state of the port.

Figure 5:
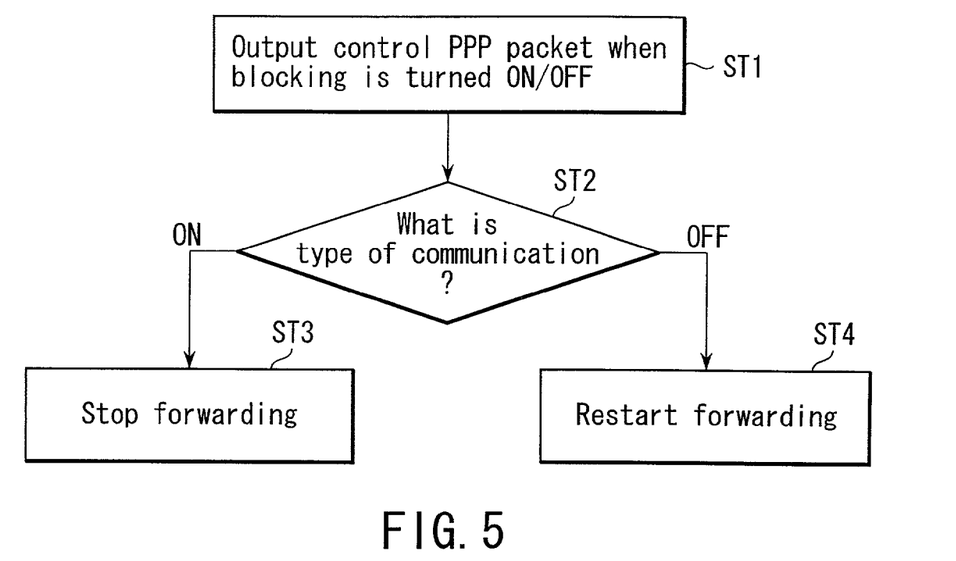
FIG. 5 is a flow chart for explaining an operation of the communication system of FIG. 1A.

That is, as shown in FIG. 5, the bridges 1A to 1C each having received a control PPP packet in which blocking is turned ON or OFF (step ST1) determines type of the received control PPP packet (step ST2).

When type of the control PPP packet indicates that blocking is turned ON, forwarding is stopped (step ST3).

In contrast, When type of the control PPP packet indicates that blocking is turned OFF, forwarding is restarted (step ST4).

Figure 6:
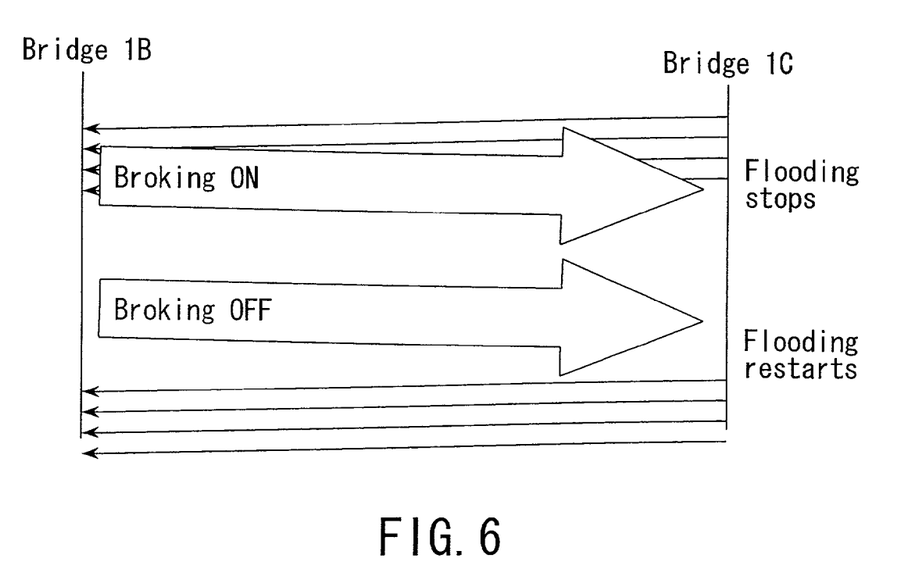
FIG. 6 is a view for explaining exchange of the control PPP packet between bridges in the communication system of FIG. 1A.

For example, when the port P2 of the bridge 1C is determined as a closed port as shown in FIG. 3A, the port P2 is determined as a closed port as shown in FIG. 6, and a control PPP packet indicating that blocking is turned ON is notified from the bridge 1C to the bridge 1B.

The bridge 1B having receiving from the bridge 1C the control PPP packet indicating that blocking is turned ON stops flooding.

In contrast, when the port P2 of the bridge 1C is released, the port P2 is released from the bridge 1C, and the control PPP packet indicating that blocking is turned OFF is notified to the bridge 1B.

Then, the bridge 1B having received from the bridge 1C the control PPP packet indicating that blocking is turned OFF restarts flooding.

In the above described method (2), the control PPP packet may be notified periodically in the same manner as that in the BPDU in the method (1) described previously.

As described above, the bridges 1 (1A to 1C) in the communication apparatus of the present embodiment have a function for notifying a counterpart bridge of information indicative of an open/closed state of its own ports P1 and P2 via a port of the counterpart bridge connected to be opposed to that port.

When the counterpart bridge having received a notification of information indicative of the open/closed state of the port determines that the contents of the information indicative of the open/closed state of the port is indicative of a closed port, the counterpart bridge switches to a closed port a port of the counterpart bridge itself connected to be opposed to such a closed port.

In a network in which a plurality of bridges are connected to each other at both ends of a line in a one-to-one manner, the outflow of redundant data to the line is reduced, thus making it possible to improve line efficiency.

In particular, if there is provided a configuration in which, when a change occurs with the open/closed state of its own port, the control PPP packet shown in FIG. 4 is notified to the counterpart bridge, the control PPP packet is notified immediately to a bridge connected to be opposed to a port in which a change occurs with the open/closed state. Thus, the outflow of redundant data from the counterpart bridge to the line can be further reduced, thereby making it possible to improve line efficiency.

Figure 1B:
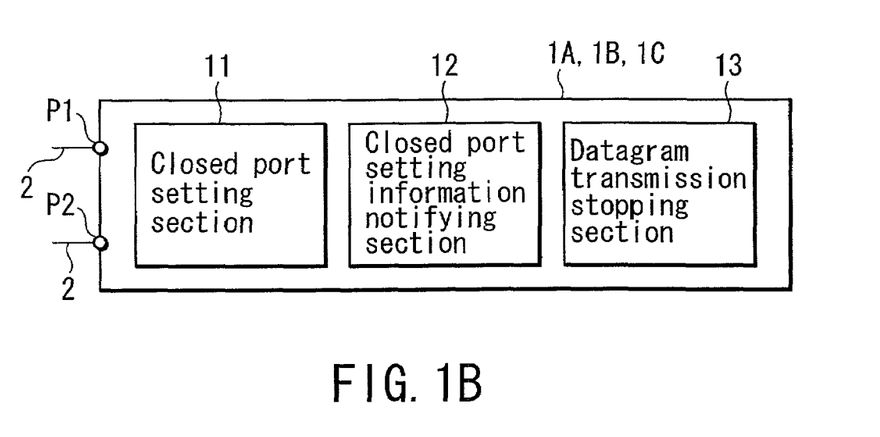
FIG. 1B is a diagram depicting an equivalent functional block of each bridge for use as a communication relay device in the communication system with a redundancy function for a line of FIG. 1A.

That is, in the communication system of the present embodiment, the bridges 1 (1A to 1C), each of which is used as a communication relay device with a redundancy function for a line and which is connected at both ends of each line in a one-to-one manner, are equivalently configured as having the following first and second ports and first to third functional blocks as shown in FIG. 1B.

The first and second ports (P1, P2) are two ports which are connected as having a one-to-one relationship with each other at both ends of each of the lines.

The first functional block is a closed port setting section 11 which sets one of the first and second ports as a closed port, thereby configuring a network (3) free of a loop between the lines.

The second functional block is a closed port setting information notifying section 12 which notifies a counterpart communication relay device connected to the one port, via the one port, of closed port setting notification information for notifying that one of the first and second ports has been set as a closed port.

The third functional block is a datagram transmission stopping section 13 for, when the above counterpart communication relay device has received the above closed port setting notification information, stopping transmission of a datagram from its own port connected to the one port set as the closed port.

In the embodiment shown in FIG. 1A, a description will be given with respect to a case where three bridges 1 (1A, 1B, 1C) being communication relay devices are connected to each other at both ends of each line 2, thereby configuring a network 3 including a redundancy channel.

Figure 1C:
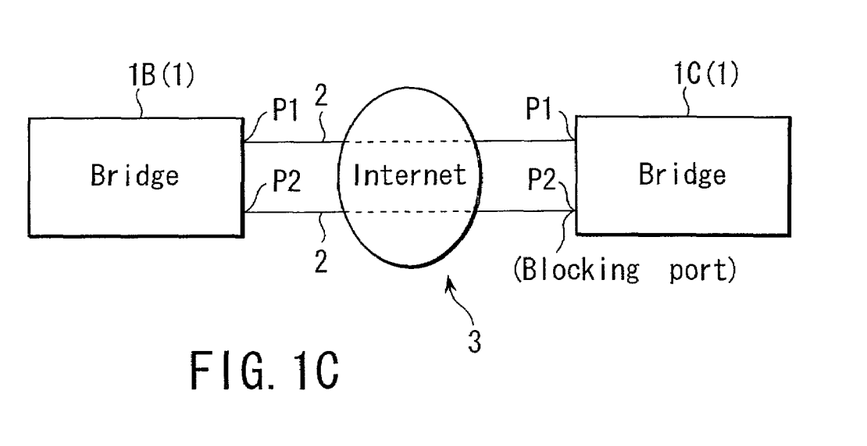
FIG. 1C is a block diagram depicting another embodiment of a communication system with a redundancy function for a line according to the present invention.

Hence, the communication system according to the present invention can also be applied to a case where two bridges 1 (1B, 1C) are connected to each other at both ends of each line 2 in a one-to-one manner, thereby configuring the network 3 including a redundancy channel, as shown in FIG. 1C, for example, without being limited to the case where the three bridges 1 (1A, 1B, 1C) are used.

That is, the communication system according to the present invention can also be applied to a case where two or more bridges 1 (1B, 1C) are connected to each other at both ends of each line 2 in a one-to-one manner, thereby configuring the network 3 including a redundancy channel.

In the meantime, in the communication system of the present embodiment, in the case where data is transmitted/received between the bridges (LANs), such transmission/reception can be carried out via a leased line or dialup network as well as the above described Internet VPN.

As is evident from the foregoing description, according to the present invention, there can be provided a network configuration in which a plurality of communication relay devices are connected to each other at both ends of a line in a one-to-one manner, wherein the outflow of redundant data to the line can be reduced, thus making it possible to improve line efficiency.

Therefore, as described above in detail, according to the present invention, there can be provided a communication relay device with a redundancy function for a line and a communication system and method with a redundancy function for a line using the relay device in a network in which a plurality of communication devices are connected to each other at both ends of a line in a one-to-one manner, wherein the outflow of redundant data to the line is reduced, thereby making it possible to improve line efficiency.

What is claimed is:

1. A communication relay device with a redundant line function enabling a line to be connected as a redundant channel, wherein the relay device configures the redundant channel from among a plurality of lines in a network in accordance with a wide area network environment, the relay device comprising:
   first and second ports which are each connected to one end of a respective line of the plurality of lines, and wherein another end of each respective line of the plurality of lines is connected to a port of another communication relay device;
   a closed port setting section which sets one of the first and second ports as a closed port, thereby configuring the network to be free of a loop;
   a closed port setting information notifying section which notifies a device connected to the closed port, via the closed port, of closed port setting notification information thereby notifying the connected device that the port to which the device is connected is set as the closed port, wherein the connected device has a same structure as the communication relay device; and
   a datagram transmission stopping section which, in the connected device, upon receiving the closed port setting notification information via one of the first and second ports of the connected device, stops transmission of a datagram from the port via which the closed port setting notification information is received.

2. The communication relay device with a redundancy function for a line according to claim 1, wherein the plurality of lines include first and second lines.

3. The communication relay device with a redundancy function for a line according to claim 1, wherein the plurality of lines include first, second, and third lines.

4. The communication relay device with a redundancy function for a line according to claim 1, wherein the datagram is transmitted/received via any of an Internet VPN, a leased line, and a dialup network.

5. The communication relay device with a redundancy function for a line according to claim 1, wherein the communication relay device is a bridge.

6. A communication system with a redundant line function in a network in accordance with a wide area network environment, the communication system comprising:
   a plurality of lines; and
   a plurality of communication relay devices to be connected, wherein the plurality of communication relay devices configure a redundant channel from among the plurality of lines in the network,
   wherein each of the plurality of communication relay devices comprises:
   first and second ports which are each connected to one end of a respective line of the plurality of lines, and wherein another end of each respective line of the plurality of lines is connected to a port of another one of the plurality of communication relay devices;
   a closed port setting section which sets one of the first and second ports as a closed port, thereby configuring the network to be free of a loop;
   a closed port setting information notifying section which notifies a device connected to the closed port, via the closed port, of closed port setting notification information thereby notifying the connected device that the port to which it is connected is set as the closed port, wherein the connected device is one of the plurality of communication relay devices and each of the plurality of communication relay devices has a same structure; and
   a datagram transmission stopping section which, in the connected device, upon receiving the closed port setting notification information via one of the first and second ports of the connected device, stops transmission of a datagram from the port via which the closed port setting notification information is received.

7. The communication system with a redundancy function for a line according to claim 6, wherein the plurality of lines include first and second lines, and the plurality of communication relay devices include first and second communication relay devices.

8. The communication system with a redundancy function for a line according to claim 6, wherein the plurality of lines include first, second, and third lines, and the plurality of communication relay devices include first, second, and third communication relay devices.

9. The communication system with a redundancy function for a line according to claim 6, wherein the datagram is transmitted/received via any of an Internet VPN, a leased line, and a dialup network.

10. The communication system with a redundancy function for a line according to claim 6, wherein each of the plurality of communication relay devices is a bridge.

11. A communication method with a redundant line function in accordance with a wide area network environment, the communication method comprising:
   providing a plurality of lines;
   connecting a plurality of communication relay devices each having first and second ports to the plurality of lines, such that the first and second ports are each connected to one end of a respective line of the plurality of lines, and such that another end of each respective line of the plurality of lines is connected to a port of another communication relay device, and wherein the plurality of communication relay devices configure a redundant channel from among the plurality of lines;

setting one of the first and second ports as a closed port so that any of the plurality of communication relay devices configures a network free of a loop;

notifying a device connected to the closed port of closed port setting notification information, thereby notifying the connected device that the port to which it is connected is set as the closed port, wherein the connected device is one of the plurality of communication relay devices and each of the communication relay devices has a same structure; and upon receiving closed port setting notification information in the connected device via one of the first and second ports of the connected device, stopping transmission of a datagram from the port via which the closed port setting notification information is received.

12. The communication method with a redundancy function for a line according to claim 11, wherein the plurality of lines include first and second lines and the plurality of communication relay devices include first and second communication devices.

13. The communication method with a redundancy function for a line according to claim 11, wherein the plurality of lines include first, second, and third lines, and the plurality of communication relay devices include first, second, and third communication relay devices.

14. The communication method with a redundancy function for a line according to claim 11, wherein the datagram is transmitted/received via any of an Internet VPN, a leased line, and a dialup network.

15. The communication method with a redundancy function for a line according to claim 11, wherein each of the plurality of communication relay devices is a bridge.

* * * * *